United States Patent [19]

Shapiro

[11] Patent Number: 4,601,212

[45] Date of Patent: Jul. 22, 1986

[54] PRECISION MICROPIPETTOR

[76] Inventor: Justin J. Shapiro, C/O Lab Industries, 620 Hearst Ave., Berkeley, Calif. 94710

[21] Appl. No.: 759,190

[22] Filed: Jul. 26, 1985

[51] Int. Cl.⁴ .............................................. G01N 1/14

[52] U.S. Cl. .................................. 73/864.18; 604/208

[58] Field of Search ........... 73/864.16, 864.17, 864.18, 73/863.32, 864.13; 604/207, 208, 209, 210, 211, 218; 222/14; 141/23

[56] References Cited

U.S. PATENT DOCUMENTS 2,902,034 9/1959 Simmonds .................... 73/864.16 X 3,591,056 6/1971 Griffin ............................. 73/864.18

*Primary Examiner*—Jerry W. Myracle

*Attorney, Agent, or Firm*—Browdy and Neimark

[57] ABSTRACT

A precision micropipettor device, primarily useful for dispensing a predetermined, accurate fixed volume quantity of fluid, includes a tubular fluid holding barrel having a dispensing end and a working end, a removable fluid holding outlet conduit secured to the dispensing end, a plunger shaft assembly for reciprocal movement within the tubular fluid holding barrel to dispense reagent contained in the fluid holding outlet conduit, and a mechanism for predetermining the range of movements of the plunger shaft assembly along the longitudinal length of the fluid holding barrel. The device can repeatedly dispense an accurate predetermined quantity of fluid. The device includes visual indication elements for communicating to an operator the resting position of the plunger shaft assembly. The device also includes a spring for returning the plunger shaft assembly to a preferred resting position after each use which spring by itself may constitute the mechanism for predetermining the range of plunger movement.

11 Claims, 6 Drawing Figures

PRECISION MICROPIPETTOR

FIELD OF THE INVENTION

The present invention relates to micropipettors, more particularly micropipettor devices equipped with precision means for accurately and rapidly dispensing high precision volumetric quantities of liquid.

BACKGROUND OF THE INVENTION

Micropipettors (or syringes) are generally utilized in laboratories and medical facilities for accurately dispensing and/or measuring quantities of liquid. Over the years, many precision micropipettor devices (disposable as well as nondisposable types), capable of precisely dispensing a predetermined amount of liquid easily and rapidly, have been proposed. Many of these pipette devices include spring means surrounding or adjacent the plunger element for accurately assisting an operator's hand motion when an operator depresses the head of the plunger to dispense a predetermined quantity of liquid.

For example, U.S. Pat. Nos. 2,792,157 to Gilman and 2,798,647 to Broadwin, both show liquid dispensing pipettes which are provided with springs which serve to bias the pipette plunger at its uppermost position. Furthermore, U.S. Pat. No. 3,815,790 to Allen et al discloses a liquid dispensing pipette equipped with a spring surrounding the plunger element within the interior of the liquid holding barrel of the pipette. However, these above-mentioned devices are additionally incorporated with spring supporting and gauging structures which made the pipette cumbersome and sometimes difficult to operate under all conditions.

A spring directly between the cap of the plunger and the flange of the barrel of an ordinary syringe is seldom seen because the spring's properties would be destroyed as the syringe expelled about half of its full volume; the spring would be compressed beyond its elastic limit. That is why micropipets do not use ordinary syringes. Micropipets, as seen in the aforementioned patents, have long plunger shafts and correspondingly long springs in order to only slightly reduce the spring length for delivering the full volume of the micropipettor, which is essentially a syringe. Thus, due to the lengths of the plunger elements utilized in these devices, it is necessary to employ long spring devices between the cap of the plunger and the flange of the barrel which often causes the springs to compress beyond their elastic limits destroying the accurate return force of the spring when the pipette is in use; in other words, if the spring is relied upon to return the plunger to its correct starting position, the pipette can only be relied upon to accurately dispense only once. No micropipettor or syringe device has previously been available for allowing an experienced or inexperienced operator to reliably rapidly and easily dispense an accurate amount of liquid repeatedly therefrom.

Additionally, due to the increasingly high cost of medical facility care, self adminstration of medicines by patients at home is becoming a usual practice. As patients depend on accurate amounts of doses, there is a great need for a syringe (or micropipette) which can inject (or dispense) accurate quantities of liquid therefrom repeatedly, rapidly and easily in a reliable way.

Another problem which exists in the prior art is the unavailability of a simple structured, fixed volume, precision micropipettor which is so inexpensive that it can be thrown way after only a few uses without economic disadvantage. At the present time, precision micropipettors are so expensive that throwing them away is not practical; in part this is so because of the presence of additional elements and the design and construction of other elements.

SUMMARY OF THE INVENTION

Accordingly, it is an object of the present invention to overcome deficiences of the prior art, such as those set forth above.

It is another object of the present invention to provide for the simple and inexpensive dispensing of precision volumetric quantities of liquid.

It is a further object of the present invention to provide an inexpensive, fixed volume, precision micropipettor which can dispense accurate amounts of liquids.

It is yet a further object of the present invention to provide an inexpensive precision micropipettor which can dispense accurate amounts of liquids therefrom repeatedly, easily and rapidly.

It is still another object of the present invention to provide a precision micropipettor which is equipped with a simple novel spring mechanism which assists in enabling the accurate dispensing of liquids in an inexpensive manner.

It is yet another object of the present invention to provide a precision micropipettor which can be utilized by experienced as well as inexperienced operators to dispense accurate quantities of liquid therefrom.

It is still a further object of the present invention to provide an inexpensive, fixed volume, precision micropipettor which can accurately measure and dispense quantities of liquid, such as for use in a laboratory environment.

It is still a further object of the present invention to provide a disposable or non-disposable precision micropipettor which is of simple and inexpensive construction and which can nevertheless dispense accurate quantities of liquid.

It is still another object of the present invention to provide a precision micropipettor capable of visually indicating to a user the resting position of the plunger shaft assembly.

Still other objects, features and attendant advantages of the present invention will become apparent to those skilled in the art from the following detailed description of the embodiments constructed in accordance therewith, taken in conjunction with the accompanying drawings.

DETAILED DESCRIPTION OF PREFERRED EMBODIMENTS

Figure 1:
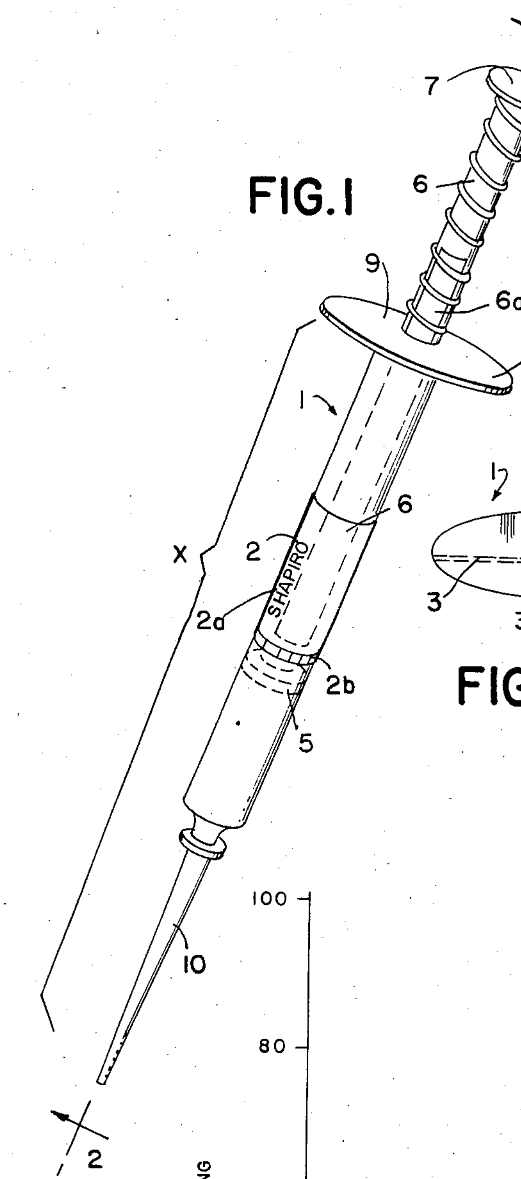
FIG. 1 is a perspective view of an embodiment of a precision micropipettor of the present invention, broken lines simulating the resting position of the plunger.

Referring now to FIG. 1 of the drawings, a first embodiment of a precision micropipettor 1 of the present invention is shown, including a chamber X provided with two sections, a tubular permanent fluid holding barrel 2 of variable volume and a removable and disposable fluid holding outlet conduit 10. Also provided are a barrel flanged region or finger grip means 4, and a shaft 6 equipped with a plunger 5 positioned in the tubular permanent fluid holding barrel 2 for increasing or decreasing the volume of barrel 2 for respectively drawing in fluid or discharging fluid from the fixed volume outlet conduit 10. In addition to being equipped at its lower end with the plunger 5, the shaft 6 is provided at its other end with a thumb depressible head 7. The micropipettor 1 is preferably made from molded plastic materials by usual methods, or instead it can be made from glass or even metal.

It should be understood that fluid or the reagent to be drawn into and then dispensed from the device is held only in the disposable, fixed volume outlet conduit 10. The permanent tubular fluid holding barrel is primarily used for displacing volumes of air which draw up and discharge equal volumes of reagent from the outlet conduit 10 (air-displacement pipet). An advantage of an air-displacement pipet is that it allows no reagent to enter the fluid holding barrel 2 the reagent being held in the disposable fluid holding outlet conduit 10, thus preventing reagent from entering the holding barrel 2 and keeping subsequent samples contaminate free.

It should also be understood that the micropipettor as described can also be utilized as a fixed-volume syringe for medical use by replacing the fluid outlet conduit 20 with a conventional syringe needle. Furthermore, even though the micropipettor device of the present invention is very inexpensive and this is one of its main attributes, it can be repeatedly reused if desired.

The fluid holding barrel 2 is provided on its outside periphery with an adherably securable, indicia bearing calibration label 2*a*, preferably transparent, for indicating to an operator the resting position of plunger 5 (shown by the dark broken lines 2*b* in FIG. 1). The label 2*a* can also be provided with information indicating volume size and whatever other information may be desirable.

Figure 3:
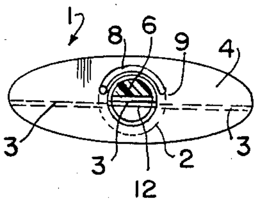
FIG. 3 is a cross-sectional view of the precision micropipettor of FIGS. 1-2 taken along line 3—3 in FIG. 2.
Figure 2:
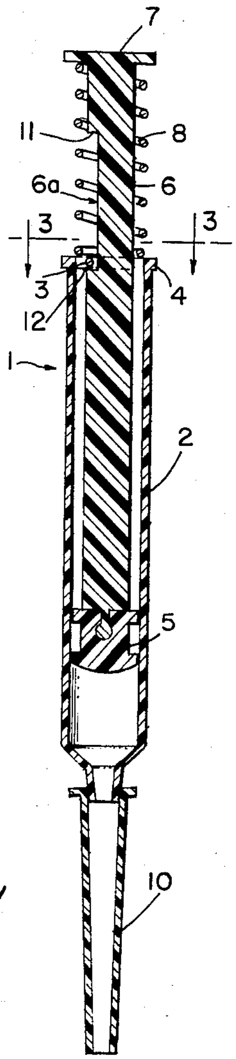
FIG. 2 is a cross-sectional view of the precision micropipettor of FIG. 1 taken along line 2—2 of FIG. 1.

Surrounding the region of the plunger shaft 6 between the thumb depressible head 7 and the finger grip means 4 is a coiled spring 8, one end of which abuts the finger grip 4 at 9, the other end abutting the underside of the thumb depressible head. The plunger shaft 6 is provided with a cutaway or recessed region 6*a* which acts as a stop and control means for the plunger shaft 6. As best seen in FIGS. 2 and 3, a stop pin 3 is positioned within the finger grip means 4 and extends horizontally across the top opening of the fluid holding barrel 2 (see FIG. 3). The stop pin 3 also lies within the recessed region 6*a* between a first stop ledge 11 and a second stop ledge 12 (see FIG. 2) and is removable for easy assembly of the micropipette's component parts. The unsecured spring 8 also allows for easy assembly, disassembly and replacement of components.

As an operator depresses the depressible thumb head 7 of the plunger shaft 6, the spring 8 will compress until the stop pin 3 comes into contact with the first stop ledge 11 of the recessed region 6*a* preventing further downward movement of plunger shaft 6. After a predetermined amount of reagent has been dispensed from the fluid holding conduit 10 by means of plunger 5, and the thumb head 7 has been released, the return force of the spring 8 will upwardly displace the plunger shaft 6 until stop pin 3 comes into contact with the second stop ledge 12, of recessed region 6*a*, preventing further upward movement of plunger shaft 6.

The stop ledges 11 and 12 thereby act to prevent over "depression" and over "return" of the plunger shaft 6. Note that second stop ledge 12 is extremely beneficial for stopping plunger shaft 6 at a returning predetermined desired resting position. Since it may be desired to duplicate accurate quantities of fluid dispensed from the same micropipette, the stop ledge 12 insures that the plunger will repeatedly return to the desired predetermined resting position after each use, i.e. the resting position of the plunger determines the volume delivered during each succeeding use provided that the spring return force is greater than the plunger's frictional force against the barrel. Accordingly, the precision micropettor of the present invention can repeatedly duplicate accurate fixed volume quantities of fluid from the same micropipette device quickly and easily, which is particularly useful when administering medicines or when measuring laboratory fluid specimens.

It should be understood that the stop pin 3 is preferably made from metal but can also be made from plastic or other materials so long as the pin 3 or equivalent stop means will not deform, easily break, or lose its regidity when the stop ledges 11, 12 comes into contact therewith. Additionally, the stop pin can be mounted at any position along the longitudinal length of the fluid holding barrel as long as cutaway 6*a* is properly relocated.

Furthermore, an operator can tell from the calibration label 2*a* whether or not the plunger 5 has returned to its required resting position by the line indicator 26 provided on the label 2*a* (see FIG. 1). If the plunger 5 returns to such fixed resting position, the line indicator 2*b* will show to the operator a solid black line, informing the user that the micropipette device will dispense a similarly accurate quantity of fluid at its next use. If, on the other hand, the plunger 5 does not return ideally to a proper resting position, line indicator 2*b* will appear as a broken line informing the operator that the next operation of the micrropipette will not dispense a similar accurate quantity of fluid. In order for the line indicator to function properly, the plunger element 5 must be of a dark color and the fluid holding barrel 2 must be made from a clear or transparent, or at least translucent, material.

There are two ways to position the groove 6*a* to maximize the precision in the two ways the micropipettor 1 may be used.

1. If the micropipettor tips 10 are disposed of after each operation so that there is zero carry-over after each operation, the groove 6*a* is desirably cut so that both stops 11 and 12 are used to limit the plunger travel in both directions. The positive stops, when a new tip is used in each operation, deliver the same volume regardless of the opeators' pressure on the plunger, and the soft rubber tip of the plunger 5 is never compressed against the bottom of the barrel. Although some small amount of sample may be left in the disposabale tip, the tip is thrown away and the volume of the delivered sample is highly reproducible.

2. If the operator wishes to use the same tip repeatedly, the forward limiting stop 12 is moved further proximally allowing the rubber plunger tip to limit the forward movement of the plunger. If the operator continues to press on the plunger after delivering the sample, the soft rubber tip compresses slightly to discharge almost all of the reagent. This action is called "blowout". Some reproducibility is sacrificed in this modification to reduce the carry-over. The same tip will be used in the next operation, and whatever reagent remains in the tip will be mixed with the next sample.

Figure 4:
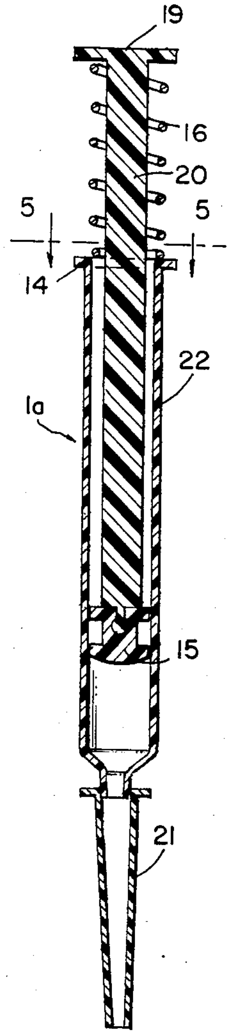
FIG. 4 is a cross-sectional view similar to FIG. 2 of an alternate embodiment of a precision micropipettor of the present invention.
Figure 5:
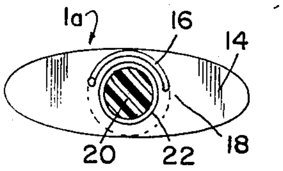
FIG. 5 is a cross-sectional view of the alternate embodiment of FIG. 4 taken along line 5—5 in FIG. 4.

A second embodiment of the precision micropipettor of the present invention is illustrated in FIGS. 4 and 5.

Just like the micropipettor's of FIGS. 1-3, the micropipettor 1*a* includes a tubular fluid holding barrel 22, a removable fluid outlet 21, a barrel flanged region or finger grip means 14, and plunger shaft means 20 for effecting aspirating and discharge of fluids from the removable fluid outlet conduit 21. The plunger shaft 20 is equipped at one end with a plunger 15 and at the other end with a thumb depressible head 19. A special spring 16 surrounds the shaft 20 between the finger grip means 14 and the thumb depressible head 19, the spring ends abutting both the finger grip 14 and the depressible head 19, respectively. This embodiment 1*a* differs from the device 1 of FIGS. 1-3, by the absence of the stop pin 3 and stop ledges 11 and 12, and by the provision of the special spring 16.

As the micropipette 1*a* must repeatedly dispense accurate quantities of fluid therefrom, the plunger 15 must resume its required initial resting position after each operation. The rest position occurs when the sliding friction of the plunger against the barrel equals the "load" or the returning force of the spring; friction between the plunger and wall of the barrel prevents movement of the plunger beyond the rest position. Because this embodiment 1*a* does not include "stop means" as provided in the first embodiment 1, a spring with a high return rate and reliable elasticity must be utilized. Coiled springs made from music wire (ASTM A228) posses high rate of return and elasticity and are appropriate in facilitating a micropipettor plunger assembly with a predetermined resting arrangement.

If, for example, the force presented by the spring 16 at the moment of full discharge is 100 times the moving frictional force of the plunger against the wall of the barrel, the spring will return the plunger to the same position upon reaching its free length with a maximum positional error of 1/100 of the total distance moved and with a maximum volume error of 1 percent. One percent error is considered high precision in volume measurements. Of course, the demonstrable relationship between the distance moved by the movable end of the spring and the force closing it, throughout the spring's operable range, is directly and precisely proportional.

The rest position of a spring is always approximate to the free length of the spring. However, to maintain the highest practical rate, the spring often operates close to its breakdown. Breakdown occurs in music wire when the maximum stress developed in the spring exceeds 45% of the minimal torsional stress (MT) of the wire material. Table I below illustrates close to the optimum spring free lengths for constructing the spring 16 using music wire for a 1 ml. volume micropipettor or syringe. The range of all micropipets is up to 1 ml or 1000 μl (microliters).

The proper spring utilized for the present invention is one having an exceptionally high rate, i.e. the return force of which is about 100 times the force necessary to overcome the plunger's sliding friction against the barrel 22, and the stress of which lies below 45% of the minimum torsional stress (MT) of the music wire employed, the MT values being supplied by spring manufacturers (see TABLE II for minimal tensile strength, $MT_2$ of music wire). With this high rate, i.e. 100 times, changes in plunger friction change the rest position very little. The rest position occurs when the sliding friction equals the load or the returning force of the spring. This rest position determines the volume delivered. This rest position, because of the high rate of the spring, is always close to the free length of the spring. Thus the embodiment 1*a* maintains its accuracy and reproducibility without the necessity of a positive stop as in the device 1.

To determine whether or not a spring will operate repeatedly without failing, the stress of the fully compressed wire spring must not exceed 45% of the minimum torsional stress (MT) of the wire, which for music wire (ASTM A 228) is 330,000 pounds per square inch for a 0.03 inch diameter music wire. Of course, spring wires other than music wire can be used to make suitable springs, e.g. hard drawn high carbon steel (ASTM A 227); oil tempered high steel (ASTM A 229); chrome vanadium (AISI 6150); chrome silicon (A151 9254); stainless steels 302, 304, 305, 316 and 17-7PH (AMS 5673B); nickel-base alloys such as Inconel X 750 (AMS 5698 and 5699), Inconel 600 (AMS 5687 B) and Ni-Span (902); phosphor bronze (ASTM B159); and beryllium copper (ASTM B 197). However, music wire is preferred.

TABLE I

TYPICAL SPECIAL MUSIC WIRE SPRINGS

| SPRING IDENTIFICATION MICROLITERS (μl) | FREE LENGTH (inches) | SPRING DEFLECTION (inches) | WIRE SIZE (inches) | ACTIVE TURNS | LOAD (P) | % TORSIONAL DESIGN STRESS OF WIRE MINIMUM TENSILE STRENGTH |
|---|---|---|---|---|---|---|
| 5 | .6418 | .0118 | .040 | 3 | 1.3 | 4.8 |
| 10 | .6536 | .0236 | .040 | 4 | 2 | 7.2 |
| 20 | .677 | .047 | .035 | 4 | 2.5 | 13 |
| 25 | .689 | .026 | .033 | 4 | 2 | 13 |
| 30 | .701 | .071 | .033 | 5 | 2.0 | 12.4 |
| 50 | .748 | .118 | .030 | 6 | 1.8 | 14.7 |
| 75 | .808 | .177 | .030 | 6 | 2.8 | 22 |
| 100 | .866 | .236 | .030 | 6 | 3.8 | 29 |
| 150 | .984 | .354 | .030 | 7 | 4.8 | 38 |
| 175 | 1.043 | .413 | .030 | 8 | 4.3 | 38 |
| 200 | 1.102 | .472 | .029 | 9 | 4.3 | 37 |
| 250 | 1.22 | .59 | .029 | 10 | 4.9 | 41.7 |
| 300 | 1.338 | .708 | .029 | 13 | 4.5 | 38.5 |

TABLE II

MINIMAL TENSILE STRENGTH (MT) OF MUSIC WIRE

| Wire Diameter WD | MTS lbs. per square inch |
|---|---|
| .029 | 333,000 |
| .030 | 330,000 |
| .033 | 327,000 |
| .035 | 324,000 |
| .040 | 315,000 |

Values may be calculated using the following spring formulas which are helpful in determining how many coils, at what diameter, and how long an ideal spring coiled wire 16 should be in conjunction with the device 1*a:*

$$R = \frac{G \times (WD)^4}{N \times 8 \times (CD)^3} \text{ lbs./in.} \quad (1)$$

$$S = \frac{8 \times P \times (CD)}{\pi \times (WD)^3} \text{ psi} \quad (2)$$

$$K = \frac{(4 \times C) - 1}{(4 \times C) - 4} + \frac{.615}{C} \quad (3)$$

Where $$C = \frac{CD}{WD}$$

$$SK = K \times S \text{ psi} \quad (4)$$

$$\frac{SK \times 100}{MT} = \text{\% maximum correct torsional strength of spring expressed as percentage of } (MT) \quad (5)$$

(where WD is wire diameter; MT is minimum tensile strength of 0.03 diameter music wire=330,000 psi; G is modulus in torsion of all music wire=11,500,000 psi; CD is mean diameter of coil in inches=O.D.—wire diameter; N is number of active turns in coil; R is rate of coil, pounds per inch of compression; P is load, R times inches of compression from free length; K is a constant which depends on the spring geometry and is given by formula 3 above; and S is torsional stress in psi.)

Figure 6:
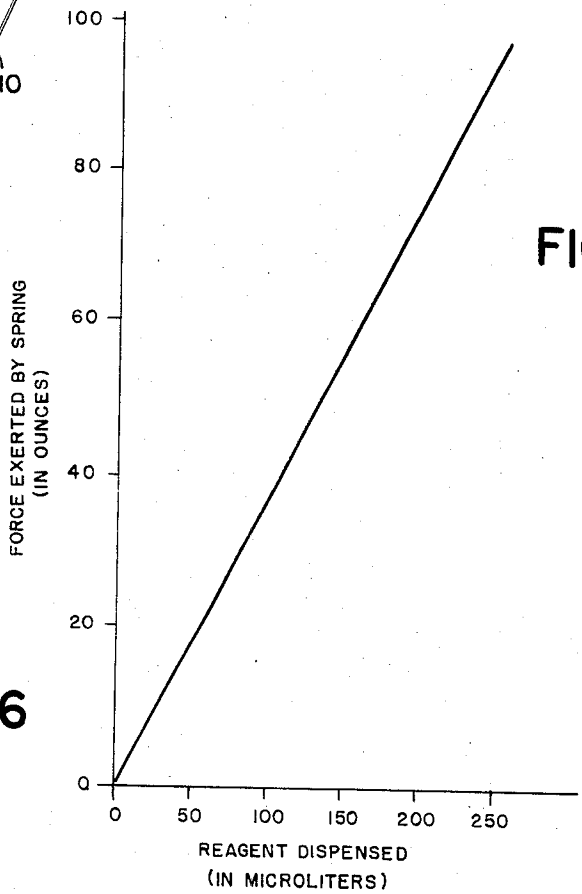
FIG. 6 is a line graph illustrating force exerted by the spring (in ounces) vs. the fluid dispensed (in microliters) by a precision micropipettor of the present invention.

Now referring to FIG. 6, there is shown a force-position (volume) graph illustrating force exerted by the spring (in ounces) vs. the fluid dispensed (in microliters) by the precision micropipettor of the present invention. As can be seen, the force exerted by the spring 16 is linearly proportional to the reagent (fluid) dispensed by the micropipette 1*a*.

It should be understood that both illustrated embodiments of the present invention discussed above accomplish the same result. The first embodiment 1 utilizes a recessed region in the plunger shaft to act as a stop means for insuring that the plunger will rest at the selected position in the fluid barrel. The second embodiment 1*a* avoids any element or mechanical stop to limit the plunger travel to a distance corresponding to a set volume, and instead the travel distance of the plunger is determined by the specially constructed spring 16 having a high value of return of its free length after discharge to insure that the plunger will reliably return to the selected resting position. Both of these embodiments allow the micropipettor to be repeatedly operated easily and rapidly for dispensing accurate quantities of liquid.

It should be further understood that experienced as well as inexperienced operators can use the precision micropipettor of the present invention easily and rapidly to dispense accurate fixed volumetric quantities of fluid repeatedly therefrom. In addition, the micropipettors of the present invention are very inexpensive to produce, costing on the order of less than only 1/200 of a conventional micropipet having the same operational characteristics.

It will be obvious to those skilled in the art that various other changes and modifications may be made without departing from the scope of the invention and the invention is not to be considered limited to what is shown in the drawings and described in the specifications.

I claim:

1. A precision micropipettor device, primarily useful for dispensing a predetermined, accurate, fixed volume quantity of fluid, comprising:

tubular fluid holding means having a longitudinal axis, a dispensing end and a working end;

a removable fluid outlet conduit means secured to said dispensing and;

a plunger shaft assembly having a first portion and a second portion, said first portion being disposed within said tubular fluid holding means and having a plunger at the end thereof, said second portion projecting outwardly from said working end of said tubular fluid holding means, said plunger shaft assembly being adapted for reciprocal motion within said tubular fluid holding means;

spring means surrounding said second portion of said plunger shaft assembly for biasly returning said plunger shaft assembly to a desired and predetermined resting position after said plunger shaft has dispensed fluid from said tubular fluid holding means and said fluid outlet conduit means;

control means, extending at least perpendicular to said longitudinal axis of said tubular fluid holding means, for predetermining the range of movements of said plunger shaft assembly in the direction of the longitudinal axis of said tubular fluid holding means, said control means including a recessed region provided on said plunger shaft assembly, said recessed region having an upper shoulder and a lower shoulder, said upper shoulder defining a first stop means and said lower shoulder defining a second stop means, and stop pin means secured to extend horizontally across said tubular fluid holding means and perpendicular to the longitudinal axis of said tubular fluid holding means, said stop pin means being received normally through said recessed region, said first stop means limiting the movement of said plunger shaft assembly in the downward longitudinal direction when said stop pin means abuts said first stop means, and said second stop means limiting the movement of said plunger shaft assembly in the upward longitudinal direction when said stop pin means abuts said second stop means, wherein said control means for predetermining the range of movements of said plunger shaft assembly in the direction of the longitudinal axis of said tubular fluid holding means permits said micropipettor device to repeatedly dispense an accurate predetermined quantity of fluid.

2. A precision micropipettor device according to claim 1, further comprising indication means for visually signalling to an operator the resting position of said first portion of said plunger shaft assembly disposed within said tubular fluid holding means.

3. A precision micropipettor device in accordance with claim 2, wherein said indication means includes an adherably securable transparent or translucent label adapted to be secured to the periphery of said tubular fluid holding means, said label provided with a dark colored broken lined region for visually indicating to an operator the return position of the plunger shaft assembly.

4. A precision micropipettor device in accordance with claim 3 wherein said plunger element is formed of a dark colored plastic material for alignment with said dark colored broken lined region of said transparent or translucent label.

5. A precision micropipettor device in accordance with claim 1, wherein said working end of said tubular holding means comprises a flanged finger grippable region including horizontally extending pin member defining said stop pin means, said pin member extending horizontally across said working end of said tubular fluid holding means.

6. A precision micropipettor device, primarily useful for dispensing a predetermined, accurate, fixed volume quantity of fluid, comprising:

transparent tubular fluid holding means having a longitudinal axis, a dispensing end and a working end;

a removable fluid outlet conduit means secured to said dispensing end;

a plunger shaft assembly having a first portion and a second portion, said first portion being disposed within said tubular fluid holding means and having a dark colored plunger at the end thereof, said second portion projecting outwardly from said working end of said tubular fluid holding means, said plunger shaft assembly being adapted for reciprocal motion within said tubular fluid holding means;

control means, extending at least perpendicular to said longitudinally axis of said tubular fluid holding means, for predetermining the range of movements of said plunger shaft assembly in the direction of the longitudinal axis of said tubular fluid holding means, and at least in part comprising a spring surrounding said second portion of said plunger shaft assembly;

and having one end thereof connected to said tubular fluid holding means and the other end thereof connected to said plunger shaft assembly;

indication means for visually signalling to an operator the resting position of said first portion of said plunger shaft assembly disposed within said tubular fluid holding means, and including a transparent or translucent label secured to the periphery of said tubular fluid holding means, said label being provided with a dark colored broken lined region for aligning with said dark colored plunger and thereby visually indicating to an operator the return position of the plunger shaft assembly;

whereby said control means for predetermining the range of movements of said plunger shaft assembly in the direction of the longitudinal axis of said tubular fluid holding means permits said micropipettor device to repeatedly dispense an accurate predetermined quantity of fluid.

7. A precision micropipettor device according to claim 6, wherein said control means for predetermining the range of movements of said plunger shaft assembly in the direction of the longitudinal axis of said tubular fluid holding means includes a recessed region provided on said plunger shaft assembly, said recessed region having an upper shoulder and a lower shoulder, said upper shoulder defining a first stop means and said lower shoulder defining a second stop means, and removable stop pin means secured to extend horizontally across said tubular fluid holding means and perpendicular to the longitudinal axis of said tubular fluid holding means, said stop pin means being received normally through said recessed region, said first stop means limiting the movement of said plunger shaft assembly in the downward longitudinal direction when said stop pin means abuts said first stop means, and said second stop means limiting the movement of said plunger shaft assembly in the upward longitudinal direction when said stop pin means abuts said second stop means.

8. A precision micropipettor device in accordance with claim 6, wherein said working end of said tubular fluid handling means comprises a flanged finger grippable region including horizontally extending pin member, said pin member defining stop pin means, said stop pin means adapted to extend horizontally across said working end of said tubular fluid holding means, and said plunger shaft assembly having a recessed region for cooperation with said stop pin, said recessed region and stop pin serving as said control means.

9. A precision micropipettor device, primarily useful for dispensing a predetermined accurate quantity of fluid comprising:

tubular fluid holding means having a longitudinal axis, a dispensing end and a working end;

a removable fluid outlet conduit means secured to said dispensing end;

tubular fluid holding means having a longitudinal axis, a dispensing end and a working end;

a plunger shaft assembly having a first portion and a second portion, said first portion disposed within said tubular fluid holding means, and having a plunger at the end thereof, said second portion projecting outwardly from said working end of said tubular fluid holding means, said plunger shaft assembly being adapted for reciprocal motion within said tubular fluid holding means;

spring means, surrounding the length of said second portion of said plunger shaft assembly, for predetermining the range of movements of said plunger shaft assembly in the direction of the longitudinal axis of said tubular fluid holding means said spring means being formed of spring wire and having a maximum load of at least 100 times said plunger's sliding friction load against the inner wall of said tubular fluid holding means and having a stress factor of at least 45% below the minimum torsional stress of said spring wire;

whereby said spring means for determining the range of movements of said plunger shaft assembly in the direction of the longitudinal axis of said tubular fluid holding means, permits said micropipettor device to repeatedly dispense an accurate predetermined quantity of fluid therefrom.

10. A precision micropipettor device in accordance with claim 9, wherein said spring wire consists of music wire.

11. A precision micropipettor device in accordance with claim 9, further comprising indication means for visually signalling to an operator the resting position of said first portion of said plunger shaft assembly disposed within said tubular fluid holding means, including an adherably securable transparent or translucent label adapted to be secured to the periphery of said tubular fluid holding means, said label being provided with a dark colored broken lined region for visually indicating to an operator the return position of the plunger shaft assembly.

* * * * *